United States Patent [19]

Rowland et al.

[11] Patent Number: 4,692,475
[45] Date of Patent: Sep. 8, 1987

[54] BLOWING AGENT COMPOSITION

[75] Inventors: Donald G. Rowland, Woodbridge, Conn.; Byron A. Hunter, Alpine; Lee D. Hansen, Orem, both of Utah

[73] Assignee: Uniroyal Chemical Company, Inc., Middlebury, Conn.

[21] Appl. No.: 940,873

[22] Filed: Dec. 10, 1986

Related U.S. Application Data

[62] Division of Ser. No. 825,401, Mar. 25, 1986, Pat. No. 4,655,962.

[51] Int. Cl.$^4$ ............................................. C08J 9/10
[52] U.S. Cl. ..................................... 521/92; 521/93; 521/94; 521/145; 521/146; 521/143; 521/144; 521/180; 521/909
[58] Field of Search ................... 521/92, 93, 94, 909, 521/143, 144, 145, 146, 180

[56] References Cited

U.S. PATENT DOCUMENTS

| | | | |
|---|---|---|---|
| 3,305,496 | 2/1967 | Riley, Jr. et al. | 521/145 |
| 3,321,413 | 5/1967 | Riley, Jr. et al. | 521/909 |
| 3,846,350 | 11/1974 | Schentzer | 260/2.5 H |
| 4,312,776 | 1/1982 | Puri et al. | 252/350 |
| 4,369,126 | 1/1983 | Bathgate | 521/909 |
| 4,425,442 | 1/1984 | Sato et al. | 521/909 |
| 4,438,223 | 3/1984 | Hunter | 521/92 |
| 4,444,679 | 4/1984 | Rowland et al. | 252/350 |
| 4,554,294 | 11/1985 | Hunter et al. | 521/93 |

FOREIGN PATENT DOCUMENTS

| | | |
|---|---|---|
| 2148099 | 4/1973 | Fed. Rep. of Germany. |
| 145876 | 12/1978 | Japan. |
| 133433 | 10/1980 | Japan. |
| 1567417 | 5/1980 | United Kingdom. |

OTHER PUBLICATIONS

Dollimore et al. J. of Inorganic Nuclear Chemistry 29, 621-627 (1967).
Djega-Mariabassou et al. Bull. Soc. Chim. France, 9, 3166-3173 (1971).

*Primary Examiner*—Morton Foelak
*Attorney, Agent, or Firm*—William E. Dickheiser

[57] ABSTRACT

A blowing agent composition, comprising: (i) azodicarbonamide; (ii) zinc oxide and/or zinc carbonate; and (iii) at least one member selected from the group consisting of zinc salts of $C_1$–$C_6$ organic acids, and $C_1$–$C_6$ organic carboxamides characterized by a high gas evolution rate. The blowing agent composition may be used in effective amounts in formulations containing a foamable polymer to yield an efficiently gas expanded polymeric composition upon exposure to heat. Suitable $C_1$–$C_6$ organic acids for said zinc salts include straight-chain carboxylic acids, and useful organic carboxamides include formamide.

10 Claims, No Drawings

BLOWING AGENT COMPOSITION

This is a division of application Ser. No. 825,401 filed Mar. 25, 1986 now U.S. Pat. No. 4,655,962, Apr. 7, 1987.

BACKGROUND OF THE INVENTION

1. Field of the Invention

The present invention relates to an improved blowing agent composition, comprised of (i) azodicarbonamide: (ii) at least one member selected from the group consisting of zinc oxide and zinc carbonate; and (iii) at least one member selected from the group consisting of the zinc salts of $C_1$–$C_6$ organic acids and $C_1$–$C_6$ carboxamides. In other aspects, this invention relates to the preparation and use of such blowing agents, as well as to foamable polymeric compositions comprising foamable polymers and such blowing agent compositions.

2. Description of Related Art

In the manufacture of expanded polymeric materials (such as polyurethanes, polyolefins and the like) the polymeric material is conventionally mixed with a blowing agent which, upon exposure to elevated temperature conditions, decomposes to form gaseous decomposition products for expansion of the material.

Amond conventionally employed blowing agents, azodicarbonamide has come into widespread usage, largely due to its broad applicability in plastics and elastomers. Moreover, this blowing agent is non-toxic, odorless and non-flammable in character, and its decomposition products present no dangerous health hazards. However, azodicarbonamide has the disadvantage that its decomposition temperature is relatively high, 210° C., rendering it difficult to utilize with many polymeric materials—particularly those having low softening temperatures or which are otherwise susceptible to thermal degradation or deterioration. Consequently, when used with polymeric materials having such disadvantageous thermal characteristics, it is desirable to add a decomposition accelerator (activator) to lower the decomposition temperature of the azodicarbonamide blowing agent.

Among the activators useful for reducing the decomposition temperature of azodicarbonamide are lead, zinc, tin and cadmium oxides, urea and various amines. While the use of such activators reduces the otherwise undesirably high decomposition temperature of azodicarbonamide, such activator-containing blowing agent compositions have the disadvantage that the rate and level of gas evolution at lower temperatures is undesirably low. Specifically, the amounts and rate of gas formed on decomposition of azodicarbonamide under low temperature activated conditions are less than those amounts obtained from decomposition of such compound at its normal high decomposition temperature.

As a result of the foregoing disadvantages, azodicarbonamide has been somewhat limited in the low temperature commercial manufacture of foamed (expanded) products.

It therefore would be highly desirable to provide azodicarbonamide in a blowing agent composition wherein the decomposition temperature for such compound is reduced and wherein the adverse impact on the volume of gas and gas evolution rates obtained therefrom is reduced or eliminated.

U.S. Pat. No. 4,312,776 to Puri et al discloses a blowing agent composition comprising azodicarbonamide, a chromium sulfate and at least one zinc compound selected from zinc salts and oxides.

A blowing agent composition comprising (a) azodicarbonamide, (b) zinc oxide, zinc carbon or a zinc salt of $C_1$–$C_4$ organic acid, and (c) an aromatic sulfinic acid or a metal salt of an aromatic sulfinic acid is disclosed in U.S. Pat. No. 4,444,679 to Rowland et al.

Japanese Patent Application No. 53145876-A describes a foamable vinyl chloride resin composition utilizing as a foaming assistant at least one zinc salt of $C_1$–$C_6$ organic carboxylic acid and azodicarbonamide. Specific carboxylic acids disclosed in this application include formic, acetic, caproic, tartaric and glycolic acids. The zinc salt is employed at a concentration of 0.5–2 weight percent based on the weight of the resin, which in addition to vinyl chloride polymers may also include other polymers such as synthetic rubbers.

A process for the production of a cellular polychloroprene vulcanizate using azodicarbonamide and at least one metal oxide as a blowing agent is disclosed in U.S. Pat. No. 3,846,350.

Japanese Patent Publication No. 133433 discloses a blowing agent composition of azodicarbonamide and the reaction product of an amine with a zinc compound.

Zinc formate compositions are described in British Pat. No. 1,567,417 (use of zinc formate in foamable polyester compositions to impart improved flame retardant properties); U.S. Pat. No. 4,438,223 (a blowing agent composition comprising zinc formate and certain inorganic and organic alkali metal activators); Dollimore et al, *Journal Of Inorganic Nuclear Chemistry*, 29, 621–627 (1967) (disclosing the decomposition behavior of zinc and manganous formates); and Djega-Mariabassou et al, *Bull. Soc. Chim. France*, 9, 3166–3173 (1971), "Study of Decompositions Causing Simultaneous Release of Several Gases, IV—Thermal Decomposition Of Zinc Formate Dihydrate and Morphology of Zinc Oxide Residual" (describing the decomposition behavior of zinc formate and the role of zinc oxide formed during its decomposition). German Offenlegungsschrift No. 2,148,099 described the expansion of thermoplastic polymers using neutral metal salts of formic and/or oxalic acid optionally with a stabilizer such as sodium phosphite.

U.S. Pat. No. 4,554,294 discloses the use of zinc salts of nitro urea in blowing agent compositions.

SUMMARY OF THE INVENTION

In one aspect, the present invention relates to a chemical blowing agent composition comprising (i) azodicarbonamide; (ii) at least one member selected from the group consisting of zinc carbonate and zinc oxide; and (iii) at least one member selected from the group consisting of zinc salts of a $C_1$–$C_6$ organic acids and $C_1$–$C_6$ carboxamides.

In one preferred aspect, the above-described blowing agent composition comprises between about 2 and about 25%, preferably between about 5 and about 25%, and most preferably between about 10 and about 15% by weight of zinc oxide and/or zinc carbonate and between about 0.5 and about 50%, preferably between about 1 and about 40%, and most preferably between about 1 and about 30% by weight of zinc salt and/or carboxamide, based on the weight of azodicarbonamide present in the composition.

In another preferred aspect, the blowing agent composition contains amounts of (ii) zinc oxide and/or zinc carbonate and (iii) the zinc salt and/or carboxamide, relative to the amount of (i) azodicarbonamide in the composition, such that the composition releases at least 150 cm$^3$ gas/gram of azodicarbonamide within 15 minutes when heated to 135° C.

In a further aspect, the blowing agent composition contains essentially no zinc sulfinate or zinc sulfonate compounds.

Another aspect of the invention relates to a foamable polymeric composition comprising (a) a foamable polymer, or monomers or co-reactants polymerizable under blowing conditions, and (b) an effective amount of a blowing agent composition as described above.

Yet another aspect of the present invention relates to a method of forming an expanded polymeric composition comprising blending a foamable polymer with the blowing agent composition as described above to yield a foamable polymeric composition, and exposing said foamable polymeric composition to heat to expand the foamable polymer therein and form the expanded polymeric composition.

A further aspect of the invention relates to a method of making a foamable polymeric composition, comprising blending a foamable polymer with an effective amount of a blowing agent composition as described above.

A still further aspect of the invention relates to a foamed polymeric composition formed by exposure of a foamable polymeric composition, as as described above, to heat.

DETAILED DESCRIPTION OF THE PREFERRED EMBODIMENTS

It has been found that the aforementioned temperature disadvantages associated with the use of azodicarbonamide as a blowing agent (viz., its high decomposition temperature of 210° C.) may be overcome and its useful temperature substantially reduced (to low temperatures, e.g., on the order of about 135° C.) by utilizing azodicarbonamide in combination with (a) zinc oxide and/or zinc carbonate and (b) a zinc salt of a $C_1$–$C_6$ organic acid and/or a $C_1$–$C_6$ carboxamide. These blowing agent compositions yield cellular synthetic polymeric materials with highly uniform cell structure and, further, reduce the tendency of such polymeric compositions to blister relative to foams produced with other known high gas evolution rate compositions.

The reason for the foregoing improvement in blowing and product characteristics is not completely understood, and while we do not wish to be bound by any theory as regards the mechanism of such improvement, it appears that there is a significant synergistic effect associated with the intimate contact of the three components (i.e., the (i) azodicarbonamide, (ii) zinc oxide and/or zinc carbonate and (iii) a zinc salt of a $C_1$–$C_6$ organic acid and/or a $C_1$–$C_6$ carboxamide) of the blowing agent composition of the present invention—as will be apparent from the data set forth in the Examples hereinafter.

The blowing agent compostion of the present invention thus comprises: (i) azodicarbonamide; (ii) at least one member of the group consisting of zinc carbonate and zinc oxide; and (iii) at least one member selected from the group consisting of zinc salts of $C_1$–$C_6$ organic acids, and $C_1$–$C_6$ carboxamides.

Suitable zinc salts useful as component (iii) in the blowing agent composition include salts of $C_1$–$C_6$ organic acids such as carboxylic acids. The straight chain carboxylic acids, e.g., formic acid, acetic acid, propionic acid, n-butyric acid, n-valeric acid and n-hexanoic acid, as well as mixtures thereof, are particularly advantageous in the practice of the present invention.

Among the aforementioned straight-chain carboxylic acids, the preferred $C_1$–$C_6$ organic acid for the zinc salt is formic acid, whereby the zinc salt is zinc formate. Such zinc salt may be provided in the blowing agent composition in the form of anhydrous zinc formate or as zinc formate dihydrate, or as mixtures thereof.

Additionally or alternately, component (iii) of the blowing agent composition of this invention may comprise a $C_1$–$C_6$ carboxamide. As used herein, the term "$C_1$–$C_6$ carboxamide" refers to a compound of the structure R—CON($R_1$)$_2$ wherein each of the R and $R_1$ substituents may vary independently of the others and is selected from hydrogen or $C_1$–$C_6$ linear or branched alkyl radicals. A particularly advantageous carboxamide useful in the practice of the present invention is formamide, although other carboxamides such as acetamide, butanamide and N-methylpropanamide and N,N-dimethylbutanamide may also be employed to good effect.

Moreover, mixtures of zinc salts of $C_1$–$C_6$ organic acids and/or of $C_1$–$C_6$ carboxamides may be employed as component (iii). In the preferred blowing agent compositions of the present invention, constituent (iii) is either zinc formate or formamide.

With regard to the performance characteristics of respective blowing agent compositions containing these constituents, rapid high volume gas evolution at a temperature of 135° C. (utilized hereinafter as a temperature condition representative of desired commercial processing thermal conditions), is more pronounced in the zinc formate-containing composition. Further, the use of zinc formate dihydrate in general provides a shorter initiation time for decomposition of azodicarbonamide than is obtained by the use of anhydrous zinc formate. However, once decomposition is achieved, both forms of zinc formate evolve gas at about equal rates.

As used herein, "zinc formate" is intended to be broadly construed to include all forms of zinc formate whether or not combined, complexed or otherwise associated with water, and such term thus includes both hydrated and anhydrous forms of zinc formate, e.g., anhydrous zinc formate as well as zinc formate dihydrate, as well as mixtures of such forms of the compound, e.g., a mixture of anhydrous zinc formate and zinc formate dihydrate.

The efficacy of the zinc formate-containing blowing agent compositions of this invention is particularly surprising when one considers that zinc formate itself if a blowing agent with a decomposition temperature of about 288° C. It is completely unexpected that one could combine two high temperature blowing agents (i.e. azodicarbonamide which decomposes at 210° C. and zinc formate which decomposes at 288° C.) with zinc oxide and/or zinc carbonate and produce a blowing composition with a decomposition temperature of only about 135° C.

Considering further the activating effect of zinc formate on azodicarbonamide, this zinc salt is preferred relative to the zinc salts of $C_2$–$C_6$ carboxylic acids.

Although the azodicarbonamide constituent of the blowing agent composition may be utilized in any form suitable for combination with the other components of the composition, it is generally preferable to utilize such material in a particulate form. When utilized in such form, the particle size of the azodicarbonamide may be varied according to the given end-use application and specific performance and product characteristics desired. In general, however, the mean particle diameter of the azodicarbonamide component is typically of the order of between about 0.5 and about 50 microns, and is preferably between about 2 and about 20 microns. Such azodicarbonamide particle sizes are particularly suitable in blowing agent compositions utilized to produce cross-linked expanded polymers.

The specific concentrations and relative proportions of (i) azodicarbonamide, (ii) zinc oxide and/or zinc carbonate, and (iii) zinc salt of a $C_1$–$C_6$ organic and/or $C_1$–$C_6$ carboxamide in this blowing agent compositions of the invention may be varied widely, depending upon the particular response time (i.e., time between exposure to the elevated temperature condition utilized, and the initial evolution of gas from the composition), gas evolution rate and gas quantity desired. One skilled in the art may, however, easily determine by routine experimentation the preferred proportions for a given expandable material and/or end use.

Preferably, for many applications, the blowing agent composition comprises sufficient amounts of (ii) zinc oxide and/or zinc carbonate and (iii) zinc salt of $C_1$–$C_6$ organic acid and/or a $C_1$–$C_6$ organic carboxamide, relative to the amount of (i) azodicarbonamide, such that the resulting blowing agent composition evolves at least 150 cm$^3$ gas/gram of azodicarbonamide within 15 minutes when heated to 135° C. Such decomposition reaction gas production rate is suitably determined by the procedure of the following test (hereinafter referred to as the "gas evolution test").

In the gas evolution test, which provides a means of evaluating various azodicarbonamide activating systems over a range of temperatures or at a set temperature (which, as indicated, is selected as 135° C. herein), the blowing agent composition is first prepared by thoroughly mixing its constituents in a Waring blender. To 0.2 gram of the resulting composition, 5 milliliters of dioctyl phthalate are added. The mixture is placed in a gas evolution measuring device, in which the non-condensable gas released during exposure of the blowing agent composition to elevated temperature is collected and measured and the measured volume corrected to standard temperature and pressure conditions (STP).

In general, the compositions of this invention preferably comprise between about 2 and about 25% by weight, more preferably between about 5 and about 20% by weight, and most preferably between about 10 and about 15% by weight of zinc oxide and/or zinc carbonate, based upon the amount of azodicarbonamide employed. Moreover, such compositions preferably contain between about 0.5 and about 50% by weight, more preferably between about 1 and about 40% by weight of zinc salt and/or carboxamide, based on the weight of azodicarbonamide present in the composition.

The blowing agent composition of this invention may further comprise additional suitable materials useful for the foaming operation or to achieve performance or structural properties for the product in its desired end-use application. Such additional optional components include catalysts, surfactants, activators (such as urea), extenders, antioxidants, stabilizers, fungicides, bacteriostats, UV absorbers and the like.

The blowing agent compositions of the present invention may be employed with any suitable expandable material. Thus, the blowing agent composition of the invention may be utilized in an effective amount of foamable polymeric compositions comprising a foamable polymer or monomer(s) polymerizable under blowing conditions or co-reactants polymerizable under such conditions. An "effective amount" of the blowing agent composition refers to the amount required to produce the desired degree of expansion of the expandable material upon exposure to heat.

Expandable materials which may usefully be employed with blowing agent compositions of this invention include natural and synthetic resins, acrylonitrile-butadiene rubbers and blends of acrylonitrile-butadiene rubbers with polyvinylchloride, polyvinylchloride, polyvinylidene chloride, polyvinyl acetate, polyethylvinyl acetate, polyesters, polyolefins (for example, low and high density polyethylene and polypropylene), modified polyphenylene oxides, polystyrenes, polyacrylates, natural and synthetic rubbers (for example, ethylene-propylene rubber, polyisoprene rubber), copolymers of the monomers amongst themselves or with other monomers (for example, copolymers of ethylvinyl acetate and an olefin such as ethylene or propylene), and mixtures thereof.

Particularly preferred thermoplastic polymeric materials include polyolefins (for example, low and high density polyethylene and polypropylene) and olefin copolymers (for example, copolymers of ethylene and ethylvinylacetate), preferably those which may be cross-linked before expansion, for example, by means of chemical cross-linking agents or by ionizing radiation.

Thermosetting polymer materials which may be used include any type of suitable rubber which is curable or vulcanizable to a solid state, exemplified by natural rubber of synthetic rubbery polymers made from diolefins such as butadiene and isoprene, or their copolymers with styrene, acrylonitrile, and the like, as well as butyl rubber, polymerized halo-diolefins, e.g., neoprene, ethylene-propylene copolymers, ethylene-propylene non-conjugated diene terpolymer elastomers and silicone rubbers.

The blowing agent compositions of the invention find general use in foaming expandable materials, especially those which are capable of setting to a normally solid state with sufficient consistency and strength at the processing temperature (either of themselves or as enabled by any confining device utilized in the blowing operation) to retain the gas evolved from the blowing agent composition and preserve a suitable structure in the expanded product. The processing temperature utilized in a specific process system will depend upon a number of factors, including the nature of the polymeric material and its visco-elastic properties, the forming equipment used, and the nature of the end product desired, etc. In general, for most effective results, it is important that that material being expanded has a consistency and tensile strength sufficient to retain, in the case of cellular structures, the blowing gas in discrete cells, thereby preventing coalescence of the blowing gas resulting in an undesirable coarse cell structure. This may generally be obtained in the case of thermosetting resins by adjusting the rate and state of cure to give the composition the desired viscosity and strength at the specific gas forming temperature employed. In the case of thermoplastic resins, the desired consistency and strength generally will be achieved by adjusting the temperature until proper viscosity is obtained. As mentioned, the specific gas forming temperature utilized in a particular system will vary with the blowing agent composition selected and will be selected depending on the polymer or other expandable material involved.

The blowing agent compositions may be mechanically mixed with expandable materials and, if desired, other customary adjuvants (such as fillers, plasticizers, stabilizers, antioxidants, UV absorbers, and the like) prior to heating the mixture to temperature at which decomposition of the blowing agent takes place.

In general, the amount of blowing agent composition used with the expandable material may vary widely depending on the previously mentioned factors, as may be determined without undue experimentation by one of ordinary skill in the art. In general, blowing agent composition concentrations of between about 0.05 and about 20% by weight, with most preferred concentrations typically being between about 1 and about 10% by weight, based on the total weight of the foamable polymer, are employed.

Thus, a foamable polymeric composition may be formed by blending a foamable polymer with an effective amount of a blowing agent composition according to the invention. Upon blending the foamable polymer with such blowing agent composition, the resulting foamable polymeric composition may be exposed to heat to expand the foamable polymer and form an expanded polymeric composition. Depending on the blowing conditions and specific composition of the blowing agent formulation, expanded materials having specific density and other physical and performance characteristics of widely varying character, as necessary and/or desired in a given end-use application, may be produced.

The features and advantages of the present invention are further illustrated with respect to the following non-limiting Examples, wherein all parts and percentages are by weight, unless otherwise expressly stated.

EXAMPLE 1-3 AND COMPARATIVE EXPERIMENTS A-E

Cumulative gas evolution was measured at various times for several blowing agent compositions each comprising azodicarbonamide (ADC) and zinc formate dihydrate and/or zinc oxide in the amounts indicated in Table I below. The results of such testing are also summarized in Table I.

TABLE I

| | Example or Comparative Experiment | | | | | | | |
|---|---|---|---|---|---|---|---|---|
| | A | B | C | D | E | 1 | 2 | 3 |
| ADC, parts | 100 | 100 | 100 | 100 | 100 | 100 | 100 | 100 |
| Zinc formate dihydrate, parts | 1 | 11 | 18 | — | — | 1 | 6 | 13 |
| Zinc Oxide, parts | — | — | — | 11 | 18 | 11 | 12 | 13 |
| Total Gas Evolved at 135° C., cm$^3$/g of composition Minutes | | | | | | | | |
| 3 | — | 4 | — | — | — | 2 | 4 | 7 |
| 6 | 6 | 19 | 15 | — | — | 13 | 18 | 72 |
| 9 | 9 | 36 | 39 | 1 | 1 | 33 | 125 | 175 |
| 12 | 12 | 54 | 58 | 1 | 2 | 61 | 170 | 180 |
| 15 | 14 | 70 | 75 | 1 | 2 | 116 | 172 | 181 |
| Total Gas Evolved After 15 Minutes at 135° C., cm$^3$/g of ADC | 14 | 78 | 89 | 1 | 2 | 130 | 203 | 228 |

The above data show that the three component blowing agent compositions of this invention produces greater quantities of gas more quickly than do compositions comprising only ADC and zinc formate or zinc oxide.

EXAMPLES 4-7 AND COMPARATIVE EXPERIMENTS F-I

Using the gas evolution test, total gas evolution at 135° C. was determined for blowing agent compositions comprising various concentrations of azodicarbonamide zinc formate dihydrate and/or anhydrous zinc formate and/or zinc oxide. The results are indicated in Table II below.

TABLE II

| | Example or Comparative Experiment | | | | | | | |
|---|---|---|---|---|---|---|---|---|
| | F | G | H | I | 4 | 5 | 6 | 7 |
| ADC, parts | 100 | 100 | 100 | 100 | 100 | 100 | 100 | 100 |
| Zinc formate dihydrate, parts | 11 | — | 25 | — | 6 | — | 13 | — |
| Anydrous Zinc formate, parts | — | 11 | — | 25 | — | 6 | — | 13 |
| Zinc Oxide, parts | — | — | — | — | 12 | 12 | 13 | 13 |
| Total Gas Evolved at 135° C., cm$^3$/g of composition Minutes | | | | | | | | |
| 3 | 4 | 11 | 7 | 2 | 4 | 2 | 7 | — |
| 6 | 19 | 16 | 25 | 15 | 18 | 23 | 72 | 19 |
| 9 | 36 | 34 | 56 | 38 | 125 | 111 | 175 | 168 |
| 12 | 54 | 56 | 91 | 71 | 170 | 215 | 180 | 179 |
| 15 | 70 | 79 | 121 | 102 | 172 | 217 | 181 | 182 |
| Total Gas Evolved After 15 Minutes at 135° C., cm$^3$/g of ADC | 78 | 88 | 151 | 128 | 203 | 256 | 228 | 229 |

The above data indicate that three component blowing compositions which comprise zinc oxide in addition to azodicarbonamide and either zinc formate dihydrate or anhydrous zinc formate are superior to two component blowing compositions not containing zinc oxide.

EXAMPLES 8-11 AND COMPARATIVE EXPERIMENT J-P

Additional blowing agent compositions were prepared containing various concentrations of formamide, as shown in Table III, and the total gas evolution at 135° C. was determined for each of such samples.

TABLE III

| | Example or Comparative Experiment | | | | | | | | | |
|---|---|---|---|---|---|---|---|---|---|---|
| | J | K | L | M | N | P | 8 | 9 | 10 | 11 |
| ADC, parts | 100 | 100 | 100 | 100 | 100 | 100 | 100 | 100 | 100 | 100 |
| Zinc Oxide, parts | — | — | — | 11 | 18 | 43 | 6 | 13 | 19 | 12 |
| Formamide, parts | 5 | 18 | 43 | — | — | — | 19 | 13 | 6 | 6 |
| Total Gas Evolved at 135° C., cm³/g of composition Minutes | | | | | | | | | | |
| 3 | — | — | 1 | — | — | — | — | — | — | 3 |
| 6 | — | 1 | 2 | — | — | 2 | 20 | 16 | 11 | 13 |
| 9 | — | 2 | 3 | 1 | 1 | 2 | 42 | 45 | 27 | 25 |
| 12 | — | 2 | 5 | 1 | 2 | 2 | 68 | 96 | 56 | 50 |
| 15 | — | 2 | 6 | 1 | 2 | 2 | 89 | 150 | 112 | 95 |
| Total Gas Evolved After 15 Minutes at 135° C., cm³/g of ADC | 0 | 2 | 9 | 1 | 2 | 3 | 111 | 189 | 140 | 112 |

The above data once again demonstrate the synergystic effect at lower temperatures of about 135° C. of the three component blowing agent of this invention.

In the following Examples, the ingredients utilized in various compositions are identified with reference to the designations shown in Table IV below.

TABLE IV

| Ingredients | |
|---|---|
| SBR-1 | Styrene-Butadiene (24.5% bound styrene) Synpol 1502, Synpol, Inc. |
| SBR-2 | Styrene-Butadiene (58.0% bound styrene) Polysar SS255, Polysar Limited. |
| NBR | Acrylonitrile-Butadiene (32.5% ACN) Paracril BJLT, Uniroyal, Inc. |
| PVC | Polyvinyl Chloride (Tenneco 175) Tenneco Chemical Co. |
| Extender Oil | Naphthenic Oil, ASTM D2226, Type 103 (Circosol [TM] 4240). |
| Plasticizer-1 | (Santicizer 154) Monsanto Co. |
| Plasticizer-2 | Dioctylphthalate. |
| Carbowax | Polyethylene glycols (Carbowax 4000) Union Carbide Corp. |
| Plasticizer-3 | Chlorinated paraffins, 70% chlorine by wt. (Chlorowax 70) Diamond Alkali Co. |
| Stabilizer-1 | Soybean oil epoxide (Paraplex G-62, sp. gr. 0.993 at 15° C.) Rohm & Haas Co. |
| Stabilizer-2 | Chemical heat stabilizer (Mark 189A) Argus Chemical Corp. |
| Resin | Aromatic resin (Picco 100) Hercules, Inc. |
| Antioxidant-1 | Octylated diphenylamine (Octamine [TM]) Uniroyal, Inc. |
| Antioxidant-2 | Tri(mixed mono-dinonyl)phenyl phosphite (Polygard [TM]) Uniroyal, Inc. |
| Accelerator-1 | N—cyclohexyl-2-benzothiazole sulfenamide (Delac-S [TM]) Uniroyal, Inc. |
| Accelerator-2 | Zinc salt of 2-mercaptobenzothiazole (OXAF [TM]) Uniroyal, Inc. |
| Accelerator-3 | Zinc dimethyldithiocarbamate (Methazate [TM]) Uniroyal, Inc. |
| Accelerator-4 | Dipentamethylene thiuram tetrasulfide (Sulfads [TM]) R. T. Vanderbilt Co., Inc. |
| Filler-1 | Hydrated Silica (Hi-Sil 233) PPG Industries, Inc. |
| Filler-2 | Clay, sp. gr. 2.6; particle size: ca. 95% less than 2 micron (Suprex Clay [TM] J. M. Huber Corp. |
| Filler-3 | Hydrated alumina pigment (Hydral 710) Aluminum Company of America. |
| Filler-4 | Ultra-fine magnesium Silicate (Mistron Vapor [TM] Sierra Talc Co. |
| Carbon Black | N550 FEF black |
| ADC | Azodicarbonamide; av. particle size: 3 micron (Celogen [TM] AZ130) Uniroyal, Inc. |
| DNPT | Dinitrosopentamethylene tetramine Opex 93, Olin |
| Urea MB (.75) | Urea masterbatch 75% active BIK-OT [TM] R-464, Ware Chemical Corp. |
| ZPTS | Zinc p-toluene sulfinate |
| ZFDH | Zinc formate dihydrate |
| AZF | Anhydrous zinc formate |
| FA | Formamide |
| DPG MB-352 (.65) | Diphenylguanadine MB-65% T(DPG) D65, Wyrough and Loser, Inc. |

EXAMPLES 12-14 AND COMPARATIVE EXPERIMENT Q

Two rubber masterbatches were prepared using the following recipes:

| | Parts by Weight |
|---|---|
| Masterbatch-1 | |
| SBR-1 | 70 |
| SBR-2 | 60 |
| Filler-1 | 30 |
| Filler-2 | 100 |
| Resin | 10 |
| Antioxidant-1 | 2 |
| Stearic Acid | 1 |
| Zinc Oxide | 5 |
| Extender Oil | 10 |
| Total parts | 288 |
| Masterbatch-2 | |
| NBR | 50.0 |
| PVC | 50.0 |
| Stabilizer-1 | 3.0 |
| Stabilizer-2 | 2.0 |
| Antimony Oxide | 5.0 |
| Filler-3 | 60.0 |
| Antioxidant-2 | 1.0 |
| Plasticizer-1 | 15.0 |
| Filler-1 | 25.0 |
| Filler-4 | 24.0 |
| Carbon Black | 10.0 |
| Zinc Oxide | 8.0 |
| Antioxidant-1 | 1.0 |
| Plasticizer-2 | 15.0 |
| Plasticizer-3 | 15.0 |
| Total parts | 284.0 |

Blowing agent compositions of the invention (Examples 12-14) were evaluated for the expansion of press molded cellular shoe soling while simultaneously curing the polymeric material, versus a composition comprising a conventional blowing agent, dinitrosopentamethylene tetramine. The compositions and results for these Samples are set forth in Table V below.

TABLE V

| Example or Comparative Experiment | Q | 12 | 13 | 14 |
|---|---|---|---|---|
| Masterbatch-1 | 288.00 | 288.00 | 288.00 | 288.00 |
| Delac-S | 0.80 | 0.80 | 0.80 | 0.80 |
| DPG MB-352 (.65) | 0.45 | 0.45 | 0.45 | 0.45 |
| Sulfur | 2.50 | 2.50 | 2.50 | 2.50 |
| BIK-OT MB-464 (.75) | 3.20 | 1.33 | 1.33 | 1.33 |
| Carbowax | 1.00 | 1.00 | 1.00 | 1.00 |
| Blowing Agent* | 4.00 | 5.00 | 5.00 | 5.00 |
| Total | 299.95 | 299.08 | 299.08 | 299.08 |
| Precure 11 min. 163° C. | | | | |
| Density, g/cm$^3$ | 0.47 | 0.44 | 0.45 | 0.49 |
| Compression Set, 50% RT 22 HOurs, % | 12 | 13 | 14 | 17 |
| Shrinkage 6 hrs. 100° C. L & W % | 2.7–1.0 | 1.0–1.25 | 1.25–0.5 | 0.75–1.0 |
| Average | 1.85 | 1.12 | 0.88 | 0.88 |

*In Comparative Experiment Q, the blowing agent was DNPT. In Examples 12-14, the blowing agent comprised 4.25 parts ADC, 0.50 part zinc oxide and 0.25 part of either ZFDH (in Example 12), AZF (in Example 13) or FA (in Example 14).

The above data show that decreased shrinkage is encountered in blown compositions produced employing the blowing agent of this invention relative to a commercially employed blowing agent, DNPT.

EXAMPLE 15

The usefulness of blowing agent compositions of the invention (Example 15) was further evaluated in insulation tubing using the following recipe, all in parts by weight, with the results shown in Table VI below.

TABLE VI

| Masterbatch-2 | 284.0 |
|---|---|
| Sulfur | 2.3 |
| Accelerator-4 | 1.7 |
| Accelerator-3 | 1.5 |
| Accelerator-2 | 0.6 |
| Blowing Agent* | 31.0 |
| Total parts | 321.1 |
| Density, g/cm$^3$ | |
| Precure 4 in/127° C. plus 8 min/149° C. | 0.082 |
| 10 min/149° C. | 0.070 |
| 6 min/127° C. plus 8 min/149° C. | 0.082 |

*The blowing agent comprised 26.4 parts ADC, 3.1 parts zinc oxide and 1.5 parts ZFDH.

This data shows that insulation having desirable properties may be produced employing the blowing agents of this invention.

What is claimed is:

1. A foamable polymeric composition, comprising (a) at least one member selected from the group consisting of foamable polymers and monomers or coreactants polymerizable under blowing conditions, and (b) an effective amount of a blowing agent composition (i) azodicarbonamide; (ii) at least one member selected from the group consisting of zinc oxide and zinc carbonate; and (iii) at least one member selected from the group consisting of zinc salts of $C_1$–$C_6$ organic acids, and $C_1$–$C_6$ carboxamides.

2. The foamable polymeric composition according to claim 1, wherein said foamable polymer is polyurethane.

3. The foamable polymeric composition according to claim 1, wherein said foamable polymer is a polyolefin.

4. The foamable polymeric composition according to claim 1, wherein said foamable polymer is a cross-linked expandable polyolefin.

5. The foamable polymeric composition according to claim 1, wherein said foamable polymer is a natural or synthetic rubber.

6. The foamable polymeric composition according to claim 1, wherein said foamable polymer is selected from polyvinylchloride; acrylonitrile-butadiene rubbers; blends of acrylonitrile-butadiene rubbers with polyvinylchloride; polyvinylidene chloride; polyvinylacetate; polyethylvinyl acetate; polyesters, polyolefins; polyphenylene oxides; polystyrenes; ethylene-propylene rubber; polyisoprene rubber; polymers of halo-diolefins; polyamides; polyacrylates; copolymers of monomers of the foregoing polymers; and mixtures of the foregoing.

7. The foamable polymeric composition according to claim 1, wherein said foamable polymer is elastomeric or thermoplastic.

8. The foamable polymeric composition according to claim 1, wherein the concentration of said blowing agent is from about 0.05 to about 20% by weight, based on the weight of said foamable polymer.

9. The foamable polymeric composition according to claim 8, wherein the concentration of said blowing agent is from about 0.1 to about 15% by weight, based on the weight of said foamable polymer.

10. The foamable polymeric composition according to claim 9, wherein the concentration of said blowing agent is from about 1 to about 10% by weight, based on the weight of said foamable polymer.

* * * * *